(12) United States Patent
Kim

(10) Patent No.: US 12,197,621 B2
(45) Date of Patent: Jan. 14, 2025

(54) METHOD FOR DE-IDENTIFYING PRIVACY-RELATED REGION WITHIN IMAGE AND DE-IDENTIFYING DEVICE USING THE SAME

(71) Applicant: Deeping Source Inc., Seoul (KR)

(72) Inventor: Jee Wook Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 282 days.

(21) Appl. No.: 17/748,949

(22) Filed: May 19, 2022

(65) Prior Publication Data

US 2023/0376633 A1     Nov. 23, 2023

(51) Int. Cl.
*G06F 21/62* (2013.01)
*G06N 3/084* (2023.01)
*G06T 7/11* (2017.01)

(52) U.S. Cl.
CPC ......... *G06F 21/6254* (2013.01); *G06N 3/084* (2013.01); *G06T 7/11* (2017.01); *G06T 2207/20076* (2013.01); *G06T 2207/20081* (2013.01); *G06T 2207/20084* (2013.01)

(58) Field of Classification Search
CPC .. G06F 21/6254; G06N 3/084; G06N 3/0455; G06T 7/11; G06T 2207/20076; G06T 2207/20081; G06T 2207/20084
See application file for complete search history.

(56) References Cited

U.S. PATENT DOCUMENTS

| 6,389,310 | B1* | 5/2002 | Demonceau | G06T 17/00 600/512 |
|---|---|---|---|---|
| 2017/0278246 | A1* | 9/2017 | Kim | G06T 7/11 |
| 2020/0143204 | A1* | 5/2020 | Nakano | G06V 10/82 |
| 2020/0357118 | A1* | 11/2020 | Yao | G06N 3/045 |
| 2022/0092360 | A1* | 3/2022 | Luss | G06N 3/08 |
| 2022/0189036 | A1* | 6/2022 | Park | G06T 5/20 |
| 2023/0205923 | A1* | 6/2023 | Ibtehaz | G06N 3/02 726/26 |

* cited by examiner

*Primary Examiner* — Mohammed Waliullah
(74) *Attorney, Agent, or Firm* — BEKIARES ELIEZER LLP

(57) ABSTRACT

A method for de-identifying a privacy-related region within an image, including steps of: (a) inputting an input image into a segmentation network to apply a segmentation operation to the input image and generate at least part of (i) each of region probabilities of each of the pixels being estimated as the privacy-related region and (ii) each of region sizes assigned to each of the pixels of the input image; and (b) (i) calculating each of standard deviations for each of the pixels of the input image by using at least part of each of the region probabilities and each of the region sizes, thereby generating each of region standard deviations and (ii) applying a de-identifying operation to each of the pixels of the input image by using each of the region standard deviations, to thereby de-identify the privacy-related region within the input image.

16 Claims, 7 Drawing Sheets

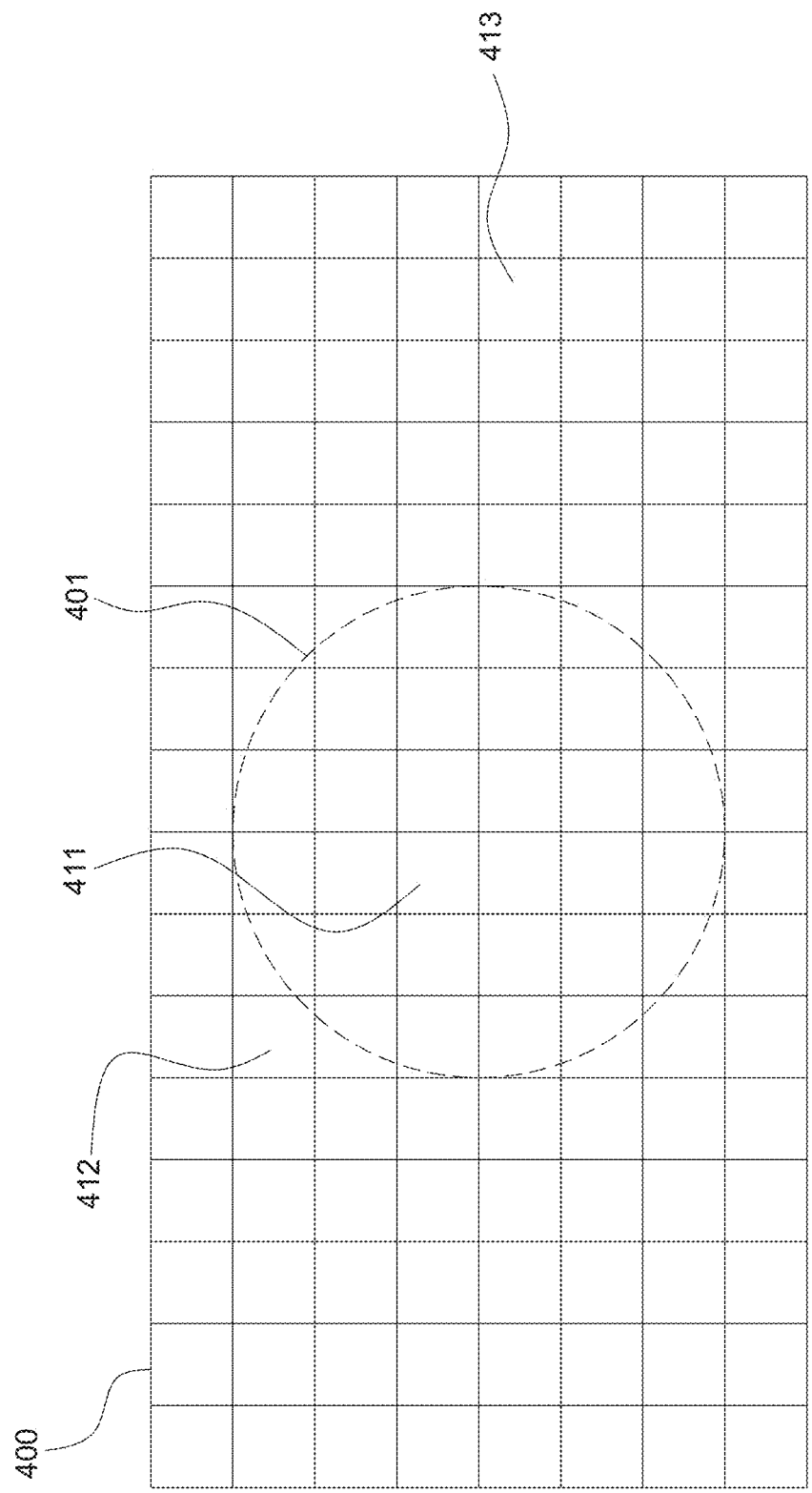

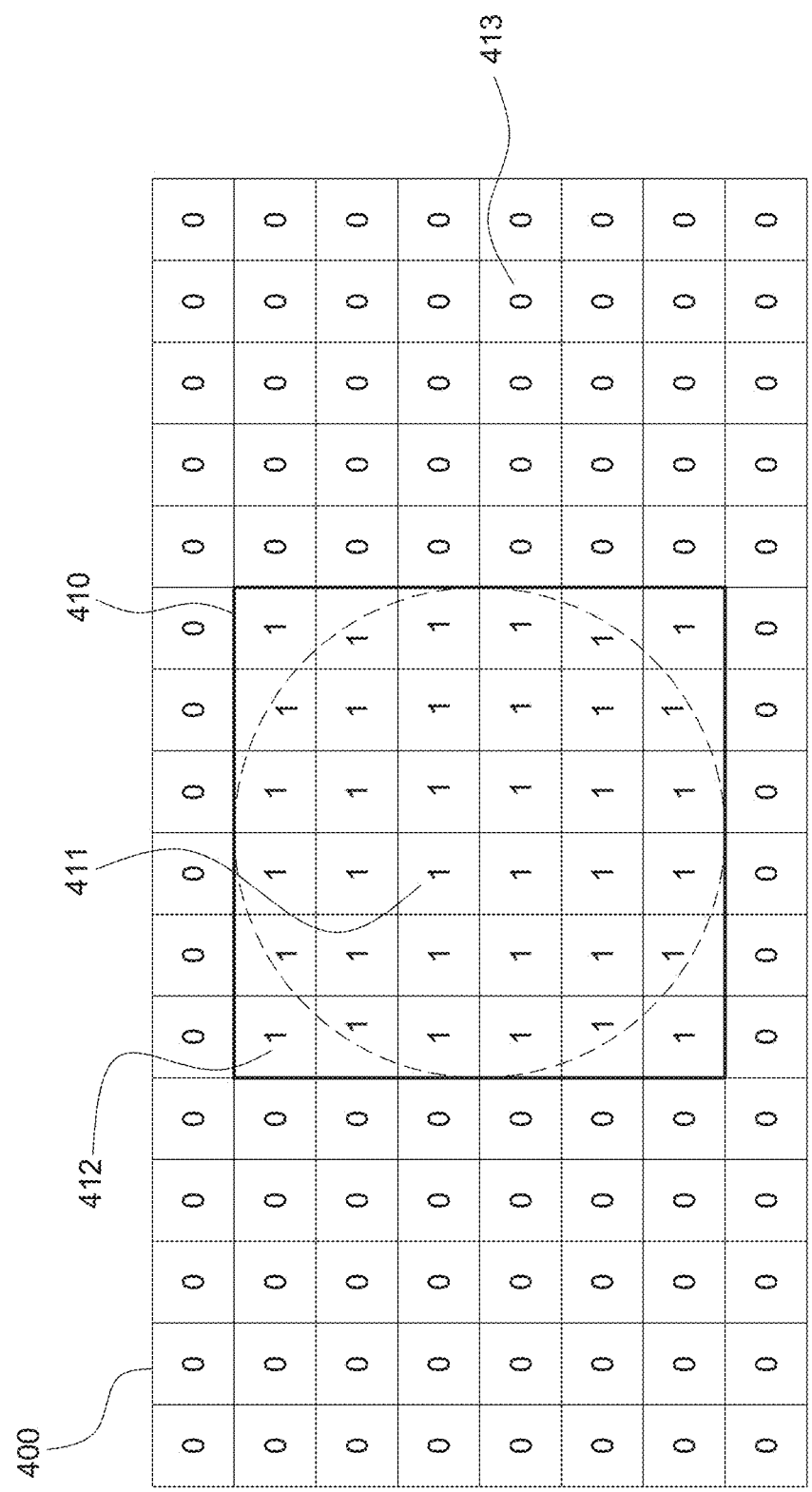

FIG. 4C

METHOD FOR DE-IDENTIFYING PRIVACY-RELATED REGION WITHIN IMAGE AND DE-IDENTIFYING DEVICE USING THE SAME

FIELD OF THE DISCLOSURE

The present disclosure relates to a method of de-identifying, e.g., concealing, anonymizing, or obfuscating, at least one privacy-related region within an image and a de-identifying device using the same; and more particularly, to the method of performing a de-identifying operation on each of pixels of the image to thereby de-identify the privacy-related region and the de-identifying device using the same.

BACKGROUND OF THE DISCLOSURE

With developments in communication technologies, a plethora of images are being traded or shared. These images may contain various privacy-related information, for example, information on human faces, and with recent strengthening of privacy protection acts, etc., a de-identifying, e.g., concealing, anonymizing, or obfuscating, processes are required before these images containing the privacy-related information are traded or shared.

According to prior arts, in order to perform de-identification, face detectors were used to acquire bounding boxes of faces within an image, and a de-identifying operation, such as a Gaussian blur operation, with a predetermined standard deviation, was applied on the detected bounding boxes.

However, such methods pose several problems.

First, as described above, with the strengthening of the privacy protection acts, etc., it is required to thoroughly de-identify the privacy-related information within the image without any being left out, but, according to the prior arts, the bounding boxes may be determined based on a thresholding method, therefore, if a probability threshold for determining the bounding boxes is set as 0.5, a bounding box with a probability of 0.49 will not meet the probability threshold and will not be subjected to the de-identifying operation. However, the bounding box with the probability of 0.49 may be a bounding box corresponding to a human face region, and therefore, if it is determined to be an invalid bounding box even though it actually is the human face region, the de-identifying operation may not be performed, resulting in a problem of potential high false negatives.

Also, according to the prior arts, since the de-identifying operation, such as the Gaussian blur using the same standard deviation (sigma), is applied to inner areas of the bounding boxes corresponding to privacy-related regions without considering sizes or perspective of the objects within the image, there may exist problems of (i) incomplete result of applying the de-identifying operation on the privacy-related regions that are located in a foreground or on the privacy-related regions occupying large areas, of the image and (ii) not being able to identify the objects corresponding to the privacy-related regions due to excessive de-identifying operations performed on the privacy-related regions located in a background or for the privacy-related regions occupying small areas.

Therefore, improvements for solving these problems are required.

SUMMARY OF THE DISCLOSURE

It is an object of the present disclosure to solve all the aforementioned problems.

It is another object of the present disclosure to precisely de-identify, e.g., conceal, anonymize, or obfuscate, at least one privacy-related region within an input image by applying a de-identifying operation having different standard deviation to each of pixels of the input image.

It is still another object of the present disclosure to thoroughly de-identify the privacy-related region of the input image without any of it being left out.

In order to accomplish objects above and characteristic effects to be described later of the present disclosure, distinctive structures of the present disclosure are described as follows.

In accordance with one aspect of the present disclosure, there is provided a method for de-identifying at least one privacy-related region within an image, including steps of: (a) a de-identifying device, in response to acquiring an input image, inputting the input image into a segmentation network, to thereby instruct the segmentation network to apply a segmentation operation on the input image and thus generate at least part of (i) each of region probabilities which represents information on each of probabilities, assigned to each of pixels of the input image, of each of the pixels being estimated as the privacy-related region and (ii) each of region sizes which represents information on each of estimated sizes, assigned to each of the pixels of the input image, of the privacy-related region; and (b) the de-identifying device (i) calculating each of standard deviations for each of the pixels of the input image by using at least part of each of the region probabilities and each of the region sizes, thereby generating each of region standard deviations and (ii) applying a de-identifying operation to each of the pixels of the input image by using each of the region standard deviations, to thereby de-identify the privacy-related region within the input image.

As one example, before the step of (a), the method further includes a step of: (a0) a learning device, in response to acquiring a training image, (i) inputting the training image into the segmentation network, to thereby instruct the segmentation network to apply the segmentation operation on the training image and thus generate at least part of (1) each of region probabilities for training which represents information on each of probabilities, assigned to each of pixels for training, of each of the pixels for training being estimated as at least one privacy-related region for training and (2) each of region sizes for training which represents information on each of estimated sizes for training, assigned to each of the pixels for training, of the privacy-related region for training, and then (ii) performing at least part of processes of (ii-1) generating each of region probability losses by referring to each of the region probabilities for training and each of first ground truths corresponding to each of the region probabilities for training and (ii-2) generating each of region size losses by referring to each of the region sizes for training and each of second ground truths corresponding to each of the region sizes for training, to thereby train at least part of parameters of the segmentation network through a backpropagation of at least part of each of the region probability losses and each of the region size losses.

As one example, each of the second ground truths corresponding to each of the region sizes for training and each of the first ground truths corresponding to each of the region probabilities for training respectively include at least one second label acquired by performing at least one labeling process on at least one bounding box for training of the privacy-related region for training within the training image and at least one first label acquired by performing at least one labeling process on at least one class for training related to the bounding box for training.

As one example, each of the second ground truths corresponding to each of the region sizes for training and each of the first ground truths corresponding to each of the region probabilities for training respectively include at least one second label acquired by performing at least one labeling process on at least one segmentation for training of the privacy-related region for training within the training image and at least one first label acquired by performing at least one labeling process on at least one class for training for each of the pixels of the training image.

As one example, each of the region standard deviations is generated by a following equation: $\sigma = \text{Probability}^{\wedge}(A) * \exp(\text{Size} * B) * C$, wherein said $\sigma$ is a region standard deviation, said Probability is a region probability, said A is a first preset constant corresponding to the Probability, said exp is an exponential function, said Size is a region size, said B is a second preset constant corresponding to the Size, and said C is a third preset constant.

As one example, said A and said B are set as values between 0 and 1, inclusive, and said C is set as a value above or equal to 0.

As one example, at the step of (b), the de-identifying device (i) determines one or more specific pixels, among the pixels of the input image, in which each of the region probabilities thereof is equal to or greater than a threshold, (ii) calculates each of specific standard deviations for each of the specific pixels by using at least part of each of specific region probabilities corresponding to the specific pixels and each of specific region sizes corresponding to the specific pixels, thereby generating each of specific region standard deviations, and (iii) applies the de-identifying operation to each of the specific pixels of the input image by using each of the specific region standard deviations, to thereby de-identify the privacy-related region within the input image.

As one example, at the step of (b), the de-identifying device (i) determines one or more specific pixels included in a specific privacy-related region among said at least one privacy-related region, (ii) averages specific standard deviations for the specific pixels included in the specific privacy-related region, to thereby acquire a specific average standard deviation, and (iii) applies the de-identifying operation to the specific privacy-related region by using the specific average standard deviation, to thereby de-identify the specific privacy-related region within the input image.

In accordance with another aspect of the present disclosure, there is provided a de-identifying device for de-identifying at least one privacy-related region within an image, including: at least one memory that stores instructions; and at least one processor configured to execute the instructions to perform processes of: (I) in response to acquiring an input image, inputting the input image into a segmentation network, to thereby instruct the segmentation network to apply a segmentation operation on the input image and thus generate at least part of (i) each of region probabilities which represents information on each of probabilities, assigned to each of pixels of the input image, of each of the pixels being estimated as the privacy-related region and (ii) each of region sizes which represents information on each of estimated sizes, assigned to each of the pixels of the input image, of the privacy-related region; and (II) (i) calculating each of standard deviations for each of the pixels of the input image by using at least part of each of the region probabilities and each of the region sizes, thereby generating each of region standard deviations and (ii) applying a de-identifying operation to each of the pixels of the input image by using each of the region standard deviations, to thereby de-identify the privacy-related region within the input image.

As one example, before the process of (I), a learning device, in response to acquiring a training image, (i) inputs the training image into the segmentation network, to thereby instruct the segmentation network to apply the segmentation operation on the training image and thus generate at least part of (1) each of region probabilities for training which represents information on each of probabilities, assigned to each of pixels for training, of each of the pixels for training being estimated as at least one privacy-related region for training and (2) each of region sizes for training which represents information on each of estimated sizes for training, assigned to each of the pixels for training, of the privacy-related region for training, and then (ii) performs at least part of processes of (ii-1) generating each of region probability losses by referring to each of the region probabilities for training and each of first ground truths corresponding to each of the region probabilities for training and (ii-2) generating each of region size losses by referring to each of the region sizes for training and each of second ground truths corresponding to each of the region sizes for training, to thereby train at least part of parameters of the segmentation network through a backpropagation of at least part of each of the region probability losses and each of the region size losses.

As one example, each of the second ground truths corresponding to each of the region sizes for training and each of the first ground truths corresponding to each of the region probabilities for training respectively include at least one second label acquired by performing at least one labeling process on at least one bounding box for training of the privacy-related region for training within the training image and at least one first label acquired by performing at least one labeling process on at least one class for training related to the bounding box for training.

As one example, each of the second ground truths corresponding to each of the region sizes for training and each of the first ground truths corresponding to each of the region probabilities for training respectively include at least one second label acquired by performing at least one labeling process on at least one segmentation for training of the privacy-related region for training within the training image and at least one first label acquired by performing at least one labeling process on at least one class for training for each of the pixels of the training image.

As one example, each of the region standard deviations is generated by a following equation: $\sigma = \text{Probability}^{\wedge}(A) * \exp(\text{Size} * B) * C$, wherein said $\sigma$ is a region standard deviation, said Probability is a region probability, said A is a first preset constant corresponding to the Probability, said exp is an exponential function, said Size is a region size, said B is a second preset constant corresponding to the Size, and said C is a third preset constant.

As one example, said A and said B are set as values between 0 and 1, inclusive, and said C is set as a value above or equal to 0.

As one example, at the process of (II), the processor (i) determines one or more specific pixels, among the pixels of the input image, in which each of the region probabilities thereof is equal to or greater than a threshold, (ii) calculates each of specific standard deviations for each of the specific pixels by using at least part of each of specific region probabilities corresponding to the specific pixels and each of specific region sizes corresponding to the specific pixels, thereby generating each of specific region standard deviations, and (iii) applies the de-identifying operation to each of the specific pixels of the input image by using each of the specific region standard deviations, to thereby de-identify the privacy-related region within the input image.

As one example, at the process of (II), the processor (i) determines one or more specific pixels included in a specific privacy-related region among said at least one privacy-related region, (ii) averages specific standard deviations for the specific pixels included in the specific privacy-related region, to thereby acquire a specific average standard deviation, and (iii) applies the de-identifying operation to the specific privacy-related region by using the specific average standard deviation, to thereby de-identify the specific privacy-related region within the input image.

In addition, recordable media that are readable by a computer for storing a computer program to execute the method of the present disclosure is further provided.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

FIGS. 4A to 4C are drawings schematically respectively illustrating a training image and its ground truths used for training the segmentation network which generates each of the region probabilities and each of the region sizes in accordance with one example embodiment of the present disclosure.

DETAILED DESCRIPTION OF THE PREFERRED EMBODIMENTS

Figure 1:
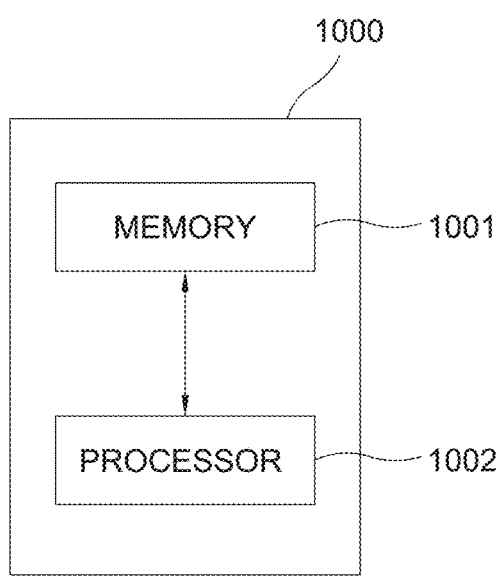
FIG. 1 is a drawing schematically illustrating a de-identifying device for de-identifying, e.g., concealing, anonymizing, or obfuscating, at least one privacy-related region on an image in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments. For reference, throughout the present disclosure, the phrase "for training" or "training" is added for terms related to training processes, and the phrase "for testing" or "testing" is added for terms related to testing processes, to avoid possible confusion.

To allow those skilled in the art to the present disclosure to be carried out easily, the example embodiments of the present disclosure by referring to attached diagrams will be explained in detail as shown below.

The description below discloses an example of a human face as a privacy-related region, however it is not limited thereto, and the present invention may be applied to any privacy-related regions.

FIG. 1 is a drawing schematically illustrating a de-identifying device for de-identifying, e.g., concealing, anonymizing, or obfuscating, at least one privacy-related region within an image in accordance with one example embodiment of the present disclosure. Referring to FIG. 1, the de-identifying device 1000 may include a memory 1001 for storing instructions to be used in de-identifying the privacy-related region and a processor 1002 for performing processes in de-identifying the privacy-related region according to the instructions stored in the memory 1001 in accordance with one example embodiment of the present disclosure.

Specifically, the de-identifying device 1000 may typically achieve a desired system performance by using combinations of at least one computing device such as a computer processor, a memory, a storage, an input device, an output device, or any other conventional computing components, at least one electronic communication device such as a router or a switch, at least one electronic information storage system such as a network-attached storage (NAS) device or a storage area network (SAN), and at least one computer software, i.e., any instructions that allow the computing device to function in a specific manner.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, according to the instructions stored in the memory 1001, the processor 1002 of the de-identifying device 1000, may, in response to acquiring an input image, input the input image into a segmentation network, to thereby instruct the segmentation network to apply a segmentation operation on the input image and thus generate at least part of (i) each of region probabilities which represents information on each of probabilities, assigned to each of pixels of the input image, of each of the pixels being estimated as the privacy-related region and (ii) each of region sizes which represents information on each of estimated sizes, assigned to each of the pixels of the input image, of the privacy-related region, and may calculate each of standard deviations for each of the pixels of the input image by using at least part of each of the region probabilities and each of the region sizes, thereby generating each of region standard deviations, and may apply a de-identifying operation to each of the pixels of the input image by using each of the region standard deviations, to thereby de-identify the privacy-related region within the input image. Herein, the de-identifying operation applied to each of the pixels of the input image may be a blurring operation such as a Gaussian blur, but the present disclosure is not limited thereto.

Figure 2:
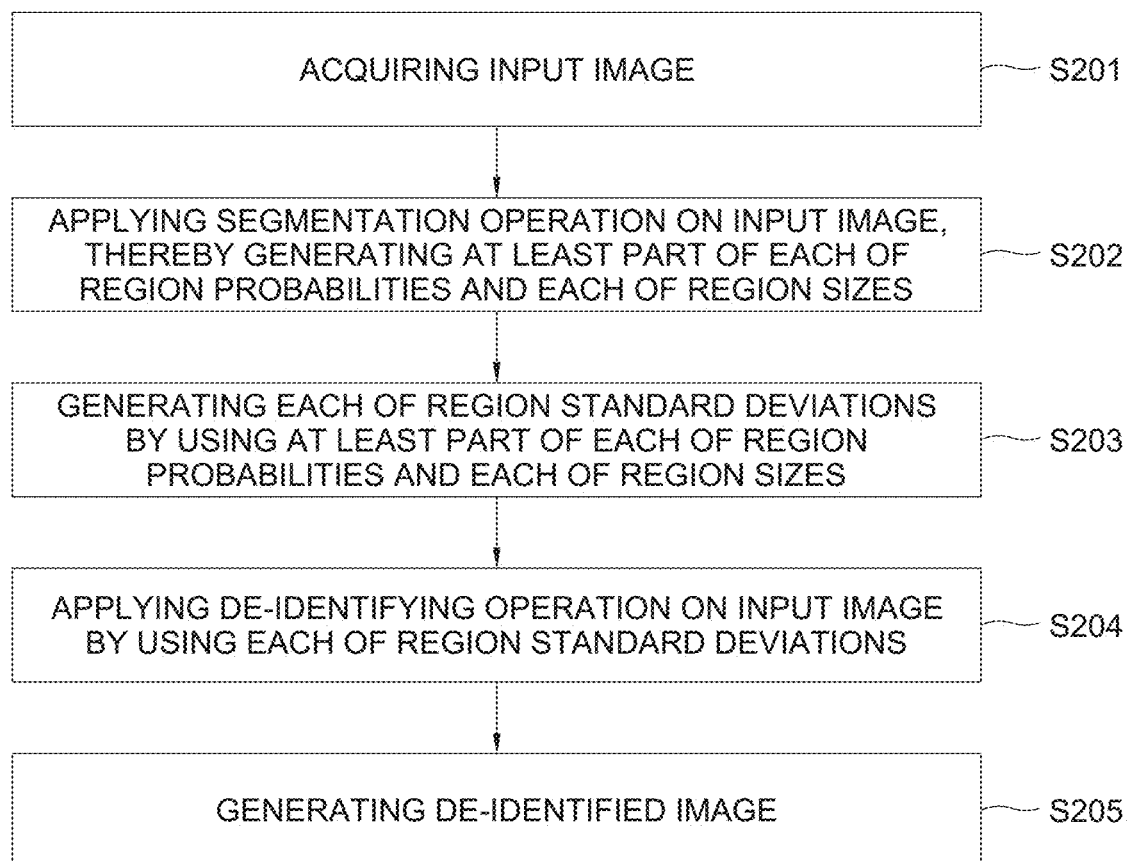
FIG. 2 is a drawing schematically illustrating a de-identifying method for de-identifying the privacy-related region on the image in accordance with one example embodiment of the present disclosure.

A method for de-identifying the privacy-related region using the de-identifying device 1000 in accordance with one example embodiment of the present disclosure is described by referring to FIG. 2 as follows.

As used in this specification and the appended claims, the singular forms "a," "an," and "the" does not exclude plural referents, i.e., one or more, unless the content or the context clearly indicate a singular meaning.

First, the de-identifying device 1000 may acquire at least one input image, at a step of S201.

Herein, the de-identifying device 1000 may be a user mobile device, or an edge computing device such as a CCTV. In this case, the input image may be an image taken or a frame of a video recorded. Alternatively, the de-identifying device 1000 may be a server that can perform the de-identifying operation on the acquired input image. In this case the input image may be acquired from another device.

Next, in response to acquiring the input image, the de-identifying device 1000 may input the input image into the segmentation network, to thereby instruct the segmentation network to apply the segmentation operation on the input image and thus generate at least part of (i) each of the region probabilities which represents information on each of the probabilities, assigned to each of the pixels of the input image, of each of the pixels being estimated as the privacy-related region and (ii) each of the region sizes which represents information on each of the estimated sizes, assigned to each of the pixels of the input image, of the privacy-related region, at a step of S202.

Figure 3:
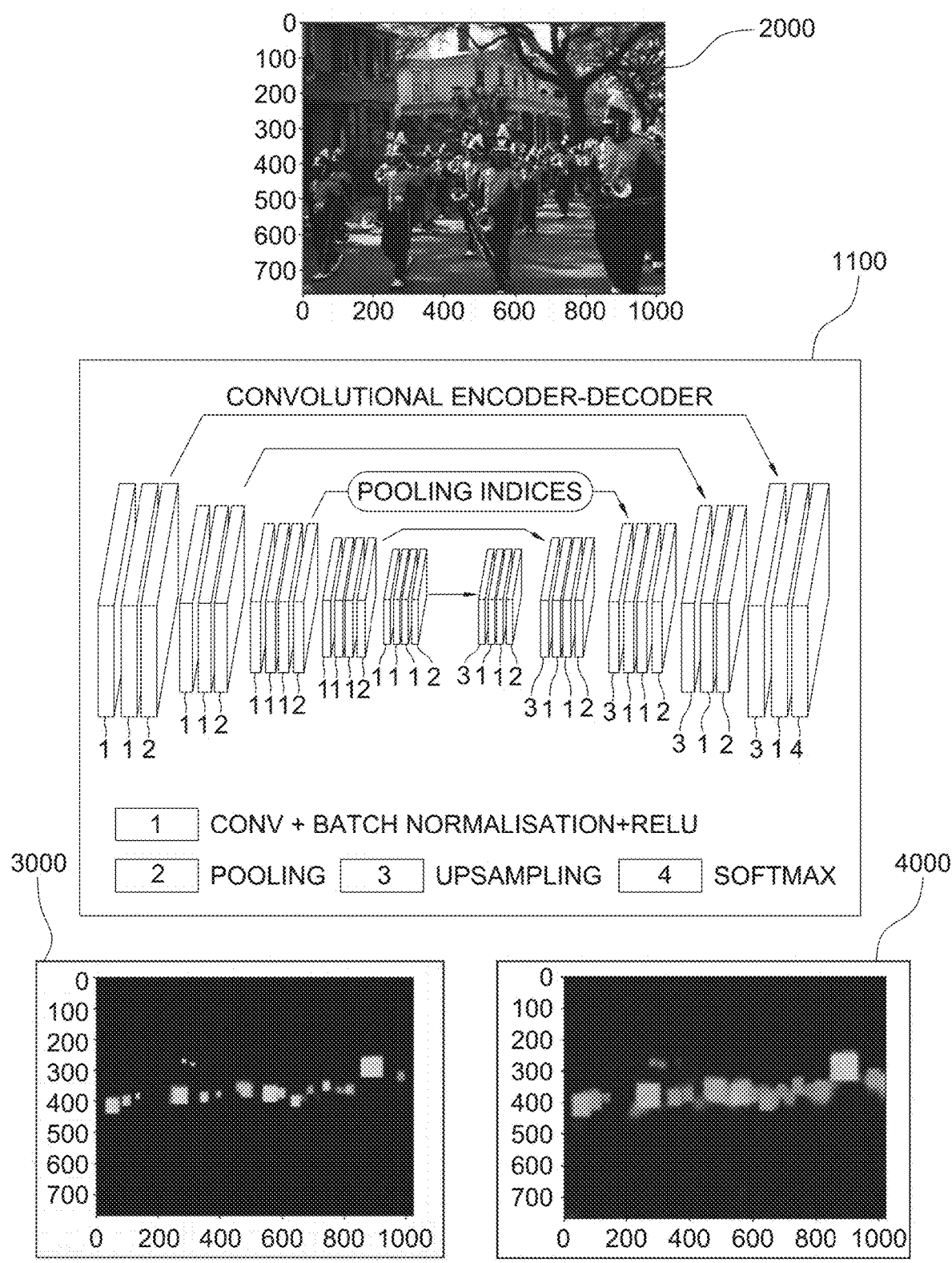
FIG. 3 is a drawing schematically illustrating each of region probabilities which represents information on each of probabilities, assigned to each of pixels of the input image, of each of the pixels being estimated as the privacy-related region and each of region sizes which represents information on each of estimated sizes, assigned to each of the pixels of the input image, of the privacy-related region, generated through a segmentation network in the de-identifying method in accordance with one example embodiment of the present disclosure.

For example, as illustrated in FIG. 3, the segmentation network 1100 that performs instructions from the de-identifying device 1000 in accordance with one example embodiment may be configured as an encoder-decoder structure with at least one convolutional layer which performs convolution operations and at least one deconvolutional layer which performs deconvolution operations, however, it is not limited thereto.

Also, the segmentation network 1100 may be a module within the de-identifying device 1000, but it is not limited thereto, and may be implemented through a separate computing device that is not the de-identifying device 1000.

Further, referring to FIG. 3, in response to the input image 2000 being inputted into the segmentation network 1100 by the de-identifying device 1000, it is possible to generate each of the region probabilities 3000 and each of the region sizes 4000 in accordance with one example embodiment of the present disclosure.

It is to be noted that each of the region probabilities 3000 and each of the region sizes 4000 will be described in more detail later on with reference to FIGS. 4A to 4C, therefore a brief description thereon is firstly provided by referring to FIG. 3 for better understanding.

First, by referring to each of the region probabilities 3000 of FIG. 3, it can be seen that it represents information on each of the probabilities, assigned to each of the pixels of the input image 2000, of each of the pixels being estimated as each of human faces. For example, from each of the region probabilities 3000, by using differences in a color inside and outside bounding boxes of the human faces, it is appreciated that the pixels inside the bounding boxes are predicted as the human faces, and the pixels outside the bounding boxes are predicted as not the human faces.

Also, by referring to each of the region sizes 4000 of the FIG. 3, it can be seen that it represents information on each of estimated sizes, assigned to each of the pixels of the input image 2000, of the human faces.

Herein, the segmentation network 1100 may be trained to generate at least part of each of the region probabilities 3000 and each of the region sizes 4000. A method for training the segmentation network is described as follows.

For example, in response to acquiring a training image, a learning device may (i) input the training image into the segmentation network 1100, to thereby instruct the segmentation network 1100 to apply the segmentation operation on the training image and thus generate at least part of (1) each of region probabilities for training which represents information on each of probabilities, assigned to each of pixels for training, of each of the pixels for training being estimated as at least one privacy-related region for training and (2) each of region sizes for training which represents information on each of estimated sizes for training, assigned to each of the pixels for training, of the privacy-related region for training.

For reference, the learning device may be a device for training the segmentation network 1100, and may be a separate computing device that is not the de-identifying device 1000, but the present disclosure does not exclude the case that it may be the same device as the de-identifying device 1000.

Herein, each of the region probabilities for training may be a result of the segmentation network estimating each of the probabilities of each of the pixels of the training image being estimated as the privacy-related region. That is, each of the region probabilities for training represents each of the estimated probabilities of each of the pixels in the training image being included in a human face(s).

Also, each of the region sizes for training may be a result of the segmentation network estimating each of the sizes of the privacy-related region for each of the pixels of the training image. That is, each of the region sizes for training represents each of the estimated sizes of the human face(s) acquired for each of the pixels in the training image.

In order to help understanding each of the region probabilities for training and each of the region sizes for training, with respect to the pixels of the training image, reference to FIG. 4A will be made.

Referring to the FIG. 4A, it illustrates a training image 400 in which a human face is captured.

For instance, a region probability corresponding to a first pixel 411 may be estimated as having a high value by the segmentation network, such as a value of 0.95, since it is located at a center of a human face region 401.

Further, a region probability corresponding to a second pixel 412 may be estimated as having a lower value than the first pixel 411 by the segmentation network, such as a value of 0.4, since it is located outside of the human face region 401.

Furthermore, a region probability corresponding to a third pixel 413 may be estimated as having a very low value by the segmentation network, such as a value of 0.15, since it is located in a region that is completely unrelated to the human face region 401.

Meanwhile, each of the region sizes for training may be a value of a size of the human face region 401 estimated by the segmentation network for each of the pixels of the training image 400.

For instance, since the first pixel 411 is located within the human face region 401, a region size corresponding to the first pixel 411 may be a value close to an area of the human face region 401, such that its region size may be estimated as a value of 30 (or length 6 by width 5) by the segmentation network.

Further, since the second pixel 412 is located outside the human face region 401, a region size corresponding to the second pixel 412 may be a value close to 0, such that its region size may be estimated as a value of 2 (or length 1 by width 2) by the segmentation network.

Furthermore, since the third pixel 413 is located in the region that is completely unrelated to the human face region 401, a region size corresponding to the third pixel 413 may be a value close to 0, such that its region size may be estimated as a value of 0 (or length 0 by width 0) by the segmentation network.

As such, each of the region sizes may indicate the estimated size of the human face region 401 acquired by using each of characteristics related to each of pixels. For instance, a particular region size corresponding to a particular pixel may be calculated by using features included in the particular pixel. That is, a size of the entire human face may be estimated by referring to features (within the particular pixel) related to the shape and/or size of the entire eye, or the shape of a part of the eye, or any other size-related features. In some cases, the size of the entire human face may be estimated by not only referring to the features within the particular pixel but also other features in its neighboring pixels. In a similar way, each region size is estimated for each pixel on the basis of features in its corresponding pixel.

Additionally, the learning device may perform at least part of processes of (i) generating each of region probability losses by referring to each of the region probabilities for training and each of first ground truths corresponding to each of the region probabilities for training and (ii) generating each of region size losses by referring to each of the region sizes for training and each of second ground truths corresponding to each of the region sizes for training.

For example, each of the first ground truths corresponding to each of the region probabilities for training may include at least one first label acquired by performing at least one labeling process on at least one class for training related to at least one bounding box for training of the privacy-related region for training within the training image.

Further, each of the second ground truths corresponding to each of the region sizes for training may include at least one second label acquired by performing at least one labeling process on said at least one bounding box for training.

As another example, each of the first ground truths corresponding to each of the region probabilities for training may include said at least one first label acquired by performing said at least one labeling process on said at least one class for training for each of the pixels of the training image.

Further, each of the second ground truths corresponding to each of the region sizes for training may include said at least one second label acquired by performing said at least one labeling process on at least one segmentation for training of the privacy-related region for training within the training image.

In order to help understanding each of the first ground truths and each of the second ground truths, references to FIGS. 4B and 4C will be made.

For example, by referring to FIG. 4B, a label acquired by performing a labeling process on a bounding box 420 corresponding to the human face region 401 and a label acquired by performing another labeling process on a class related to the bounding box 420 can be seen.

That is, pixels within the bounding box 420 of the human face region 410 may be labeled as 1s, and pixels outside the bounding box 420 may be labeled as 0s. Herein, a size of the bounding box 420 may be 36 (or length 6 by width 6).

Figure 4C:
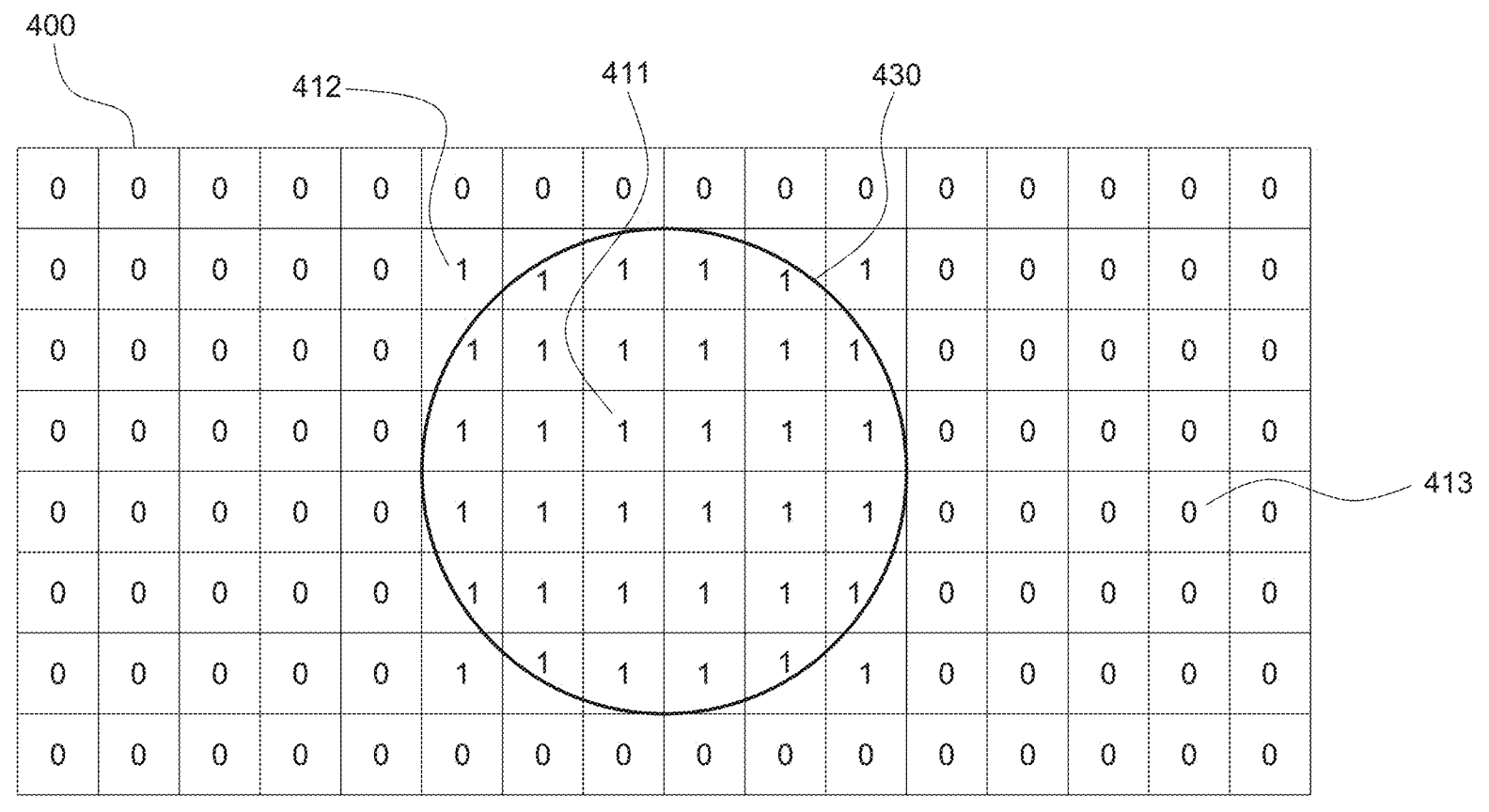

As another example, by referring to FIG. 4C, a label acquired by performing the labeling process on a segmentation 430 corresponding to the human face region 401 of FIG. 4A and a label acquired by performing said another labeling process on the class for training for each of the pixels of the training image can be seen.

That is, the pixels within the human face region 401 may be labeled as 1s, and the pixels outside the human face region 410 may be labeled as 0s. Herein, the size of the human face region 410 is 32 (or the number of pixels labeled as 1).

Below, references to FIGS. 4A and 4B will be made for explaining one example embodiment of generating each of the region probability losses and each of the region size losses.

For the first pixel 411, the region probability may be 0.95 and its corresponding ground truth may be 1, therefore a corresponding region probability loss of 0.05 may be generated.

Further, for the first pixel 411, the region size may be 30 (or length 6 by width 5) and its corresponding ground truth may be 36 (or length 6 by width 6), therefore a corresponding region size loss of 6 (or length 0 by width 1) may be generated.

Meanwhile, for the second pixel 412, the region probability may be 0.4 and its corresponding ground truth may be 1, therefore a corresponding region probability loss of 0.6 may be generated.

Further, for the second pixel 412, the region size may be 2 (or length 1 by width 2) and its corresponding ground truth may be 36 (or length 6 by width 6), therefore a corresponding region size loss of 34 (or length 5 by width 4) may be generated.

Meanwhile, for the third pixel 413, the region probability may be 0.15 and its corresponding ground truth may be 0, therefore a corresponding region probability loss of −0.15 may be generated.

Further, for the third pixel 413, the region size may be 0 (or length 0 by width 0) and its corresponding ground truth may be 0 (or length 0 by width 0), therefore a corresponding region size loss of 0 (or length 0 by width 0) may be generated.

Below, reference to FIGS. 4A and 4C will be made for explaining another example of generating each of the region probability losses and each of the region size losses.

For the first pixel 411, the region probability may be 0.95 and its corresponding ground truth may be 1, therefore a corresponding region probability loss of 0.05 may be generated.

Further, for the first pixel 411, the region size may be 30 and its corresponding ground truth may be 32, therefore a corresponding region size loss of 2 may be generated.

Meanwhile, for the second pixel 412, the region probability may be 0.4 and its corresponding ground truth may be 0, therefore a corresponding region probability loss of −0.4 may be generated.

Further, for the second pixel 412, the region size may be 2 and its corresponding ground truth may be 0, therefore a corresponding region size loss of −2 may be generated.

Meanwhile, for the third pixel 413, the region probability may be 0.15 and its corresponding ground truth may be 0, therefore a corresponding region probability loss of −0.15 may be generated.

Further, for the third pixel 413, the region size may be 0 and its corresponding ground truth may be 0, therefore a corresponding region size loss of 0 may be generated.

Moreover, the learning device may train at least part of parameters of the segmentation network through a back-propagation of at least part of each of the region probability losses and each of the region size losses.

For reference, a process of how parameters of a network is trained in which a loss, generated by using a predicted value and a correct answer value, is used to perform back-propagation is easily understandable by those skilled in the art, therefore further detail descriptions thereof will be omitted.

Further, as explained by referring to FIG. 4A, an explanation on each of the region probabilities for training and each of the region sizes for training will be omitted since they are similar to each of the region probabilities and each of the region sizes generated by the trained segmentation network.

Referring back to FIG. 2, in continuation to the method of using the de-identifying device 1000 to de-identify the privacy-related region in accordance with one example embodiment of the present disclosure, the de-identifying device 1000 may calculate each of standard deviations for each of the pixels of the input image by using at least part of each of the region probabilities and each of the region sizes, thereby generating each of region standard deviations, at a step of S203.

As an example, each of the region standard deviations may be generated by a following equation:

$$\sigma = \text{Probability}^{(A)} * \exp(\text{Size} * B) * C \qquad \text{<Equation 1>}$$

Herein, said σ is a region standard deviation, said Probability is a region probability, said A is a first preset constant corresponding to the Probability, said exp is an exponential function, said Size is a region size, said B is a second preset constant corresponding to the Size, and said C is a third preset constant.

Herein, said A and said B may be set as values between 0 and 1, inclusive, and said C may be set as a value above or equal to 0.

For reference, the reason said A and said B may be set as values between 0 and 1, inclusive, are as follows.

In general, the larger the area of the human face region, the higher a probability that a pixel located within the human face region will be determined to be the human face. That is to say, the smaller the area of the human face region, the lower the probability that the pixel located within the human face region will be determined to be the human face.

Therefore, as described before, according to the prior arts, application of the de-identifying operation for small face regions tends to be omitted.

To prevent such from happening, it is necessary to amplify at least a part of the region probabilities and the region sizes corresponding to the small face regions.

That is, by setting said A and said B as values between 0 and 1, inclusive, which are respectively an exponent applied to the region probabilities and an exponent applied to the region sizes, it is possible to (i) reduce differences between the region probabilities corresponding to large face regions and those corresponding to the small face regions, and (ii) reduce differences between the region sizes corresponding to the large face regions and those corresponding to the small face regions.

Further, the de-identifying device 1000 may (ii) apply the de-identifying operation to each of the pixels of the input image by using each of the region standard deviations, at a step of S204, to thereby generate a de-identified image in which the privacy-related region within the input image is de-identified, at a step of S205.

Figure 5:
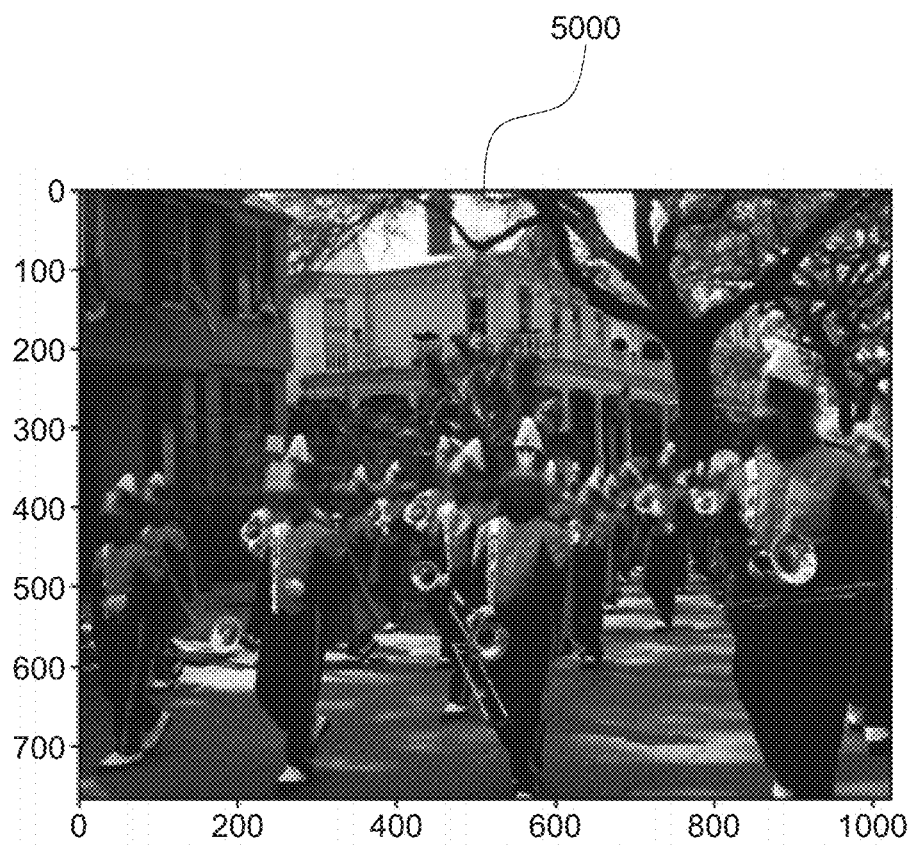
FIG. 5 is a drawing schematically illustrating a de-identified image de-identified by using the de-identifying method in accordance with one example embodiment of the present disclosure.

Referring to FIG. 5, the de-identifying device 1000 may apply the de-identifying operation to each of the pixels of the input image 2000 of FIG. 3 by using each of the region standard deviations, to thereby generate the de-identified image 5000 in which the privacy-related region within the input image 2000 is de-identified.

As such, the de-identifying device 1000 may apply the de-identifying operation to each of the pixels of the input image 2000 by using each of the region standard deviations independently generated for each of the pixels of the input image 2000, thereby de-identifying the privacy-related region more precisely than the prior arts.

Meanwhile, the de-identifying device 1000 may not apply the de-identifying operation on some pixels of the input image with very small region probabilities of being the privacy-related region, thereby ensuring calculation efficiencies in accordance with one example embodiment of the present disclosure.

For example, the de-identifying device 1000 may (i) determine one or more specific pixels, among the pixels of the input image, in which each of the region probabilities thereof is equal to or greater than a threshold, (ii) calculate each of specific standard deviations for each of the specific pixels by using at least part of each of specific region probabilities corresponding to the specific pixels and each of specific region sizes corresponding to the specific pixels, thereby generating each of specific region standard deviations, and (iii) apply the de-identifying operation to each of the specific pixels of the input image by using each of the specific region standard deviations, to thereby de-identify the privacy-related region within the input image.

For example, the de-identifying device 1000 may (i) determine one or more specific pixels, among the pixels of the input image, in which each of the region probabilities thereof is equal to or greater than 0.2, (ii) calculate each of the specific standard deviations corresponding to the specific pixels, thereby generating each of the specific region standard deviations, and (iii) apply the de-identifying operation to each of the specific pixels of the input image by using each of the specific region standard deviations, to thereby de-identify the privacy-related region within the input image.

Meanwhile, as another example, the de-identifying device 1000 may apply the de-identifying operation using a same specific region standard deviation on the pixels with a same privacy-related region, thereby ensuring calculation efficiencies in accordance with one example embodiment of the present disclosure.

For example, the de-identifying device 1000 may (i) determine one or more specific pixels included in a specific privacy-related region among said at least one privacy-related region, (ii) average the specific standard deviations for the specific pixels included in the specific privacy-related region, to thereby acquire a specific average standard deviation, and (iii) apply the de-identifying operation to the specific privacy-related region by using the specific average standard deviation, to thereby de-identify the specific privacy-related region within the input image.

The present disclosure has an effect of precisely de-identifying at least one privacy-related region within the input image by applying the de-identifying operation having different standard deviation to each of the pixels of the input image.

The present disclosure has another effect of thoroughly de-identifying the privacy-related region of the input image without any of it being left out.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for de-identifying at least one privacy-related region within an image, comprising steps of:
    (a) a de-identifying device, in response to acquiring an input image, inputting the input image into a segmentation network, to thereby instruct the segmentation network to apply a segmentation operation on the input image and thus generate at least part of (i) each of region probabilities which represents information on each of probabilities, assigned to each of pixels of the input image, of each of the pixels being estimated as the privacy-related region and (ii) each of region sizes which represents information on each of estimated sizes, assigned to each of the pixels of the input image, of the privacy-related region; and
    (b) the de-identifying device (i) calculating each of standard deviations for each of the pixels of the input image by using at least part of each of the region probabilities and each of the region sizes, thereby generating each of region standard deviations and (ii) applying a de-identifying operation to each of the pixels of the input image by using each of the region standard deviations, to thereby de-identify the privacy-related region within the input image.

2. The method of claim 1, wherein, before the step of (a), the method further comprises a step of:
    (a0) a learning device, in response to acquiring a training image, (i) inputting the training image into the segmentation network, to thereby instruct the segmentation network to apply the segmentation operation on the training image and thus generate at least part of (1) each of region probabilities for training which represents information on each of probabilities, assigned to each of pixels for training, of each of the pixels for training being estimated as at least one privacy-related region for training and (2) each of region sizes for training which represents information on each of estimated sizes for training, assigned to each of the pixels for training, of the privacy-related region for training, and then (ii) performing at least part of processes of (ii-1) generating each of region probability losses by referring to each of the region probabilities for training and each of first ground truths corresponding to each of the region probabilities for training and (ii-2) generating each of region size losses by referring to each of the region sizes for training and each of second ground truths corresponding to each of the region sizes for training, to thereby train at least part of parameters of the segmentation network through a backpropagation of at least part of each of the region probability losses and each of the region size losses.

3. The method of claim 2, wherein each of the second ground truths corresponding to each of the region sizes for training and each of the first ground truths corresponding to each of the region probabilities for training respectively include at least one second label acquired by performing at least one labeling process on at least one bounding box for training of the privacy-related region for training within the training image and at least one first label acquired by performing at least one labeling process on at least one class for training related to the bounding box for training.

4. The method of claim 2, wherein each of the second ground truths corresponding to each of the region sizes for training and each of the first ground truths corresponding to each of the region probabilities for training respectively include at least one second label acquired by performing at least one labeling process on at least one segmentation for training of the privacy-related region for training within the training image and at least one first label acquired by performing at least one labeling process on at least one class for training for each of the pixels of the training image.

5. The method of claim 1, wherein each of the region standard deviations is generated by a following equation:

$$\sigma = \text{Probability}^{\wedge}(A)*\exp(\text{Size}*B)*C$$

wherein said σ is a region standard deviation, said Probability is a region probability, said A is a first preset constant corresponding to the Probability, said exp is an exponential function, said Size is a region size, said B is a second preset constant corresponding to the Size, and said C is a third preset constant.

6. The method of claim 5, wherein said A and said B are set as values between 0 and 1, inclusive, and wherein said C is set as a value above or equal to 0.

7. The method of claim 1, wherein, at the step of (b), the de-identifying device (i) determines one or more specific pixels, among the pixels of the input image, in which each of the region probabilities thereof is equal to or greater than a threshold, (ii) calculates each of specific standard deviations for each of the specific pixels by using at least part of each of specific region probabilities corresponding to the specific pixels and each of specific region sizes corresponding to the specific pixels, thereby generating each of specific region standard deviations, and (iii) applies the de-identifying operation to each of the specific pixels of the input image by using each of the specific region standard deviations, to thereby de-identify the privacy-related region within the input image.

8. The method of claim 1, wherein, at the step of (b), the de-identifying device (i) determines one or more specific pixels included in a specific privacy-related region among said at least one privacy-related region, (ii) averages specific standard deviations for the specific pixels included in the specific privacy-related region, to thereby acquire a specific average standard deviation, and (iii) applies the de-identifying operation to the specific privacy-related region by using the specific average standard deviation, to thereby de-identify the specific privacy-related region within the input image.

9. A de-identifying device for de-identifying at least one privacy-related region within an image, comprising:
at least one memory that stores instructions; and
at least one processor configured to execute the instructions to perform processes of: (I) in response to acquiring an input image, inputting the input image into a segmentation network, to thereby instruct the segmentation network to apply a segmentation operation on the input image and thus generate at least part of (i) each of region probabilities which represents information on each of probabilities, assigned to each of pixels of the input image, of each of the pixels being estimated as the privacy-related region and (ii) each of region sizes which represents information on each of estimated sizes, assigned to each of the pixels of the input image, of the privacy-related region; and (II) (i) calculating each of standard deviations for each of the pixels of the input image by using at least part of each of the region probabilities and each of the region sizes, thereby generating each of region standard deviations and (ii) applying a de-identifying operation to each of the pixels of the input image by using each of the region standard deviations, to thereby de-identify the privacy-related region within the input image.

10. The de-identifying device of claim 9, wherein, before the process of (I), a learning device, in response to acquiring a training image, (i) inputs the training image into the segmentation network, to thereby instruct the segmentation network to apply the segmentation operation on the training image and thus generate at least part of (1) each of region probabilities for training which represents information on each of probabilities, assigned to each of pixels for training, of each of the pixels for training being estimated as at least one privacy-related region for training and (2) each of region sizes for training which represents information on each of estimated sizes for training, assigned to each of the pixels for training, of the privacy-related region for training, and then (ii) performs at least part of processes of (ii-1) generating each of region probability losses by referring to each of the region probabilities for training and each of first ground truths corresponding to each of the region probabilities for training and (ii-2) generating each of region size losses by referring to each of the region sizes for training and each of second ground truths corresponding to each of the region sizes for training, to thereby train at least part of parameters of the segmentation network through a backpropagation of at least part of each of the region probability losses and each of the region size losses.

11. The de-identifying device of claim 10, wherein each of the second ground truths corresponding to each of the region sizes for training and each of the first ground truths corresponding to each of the region probabilities for training respectively include at least one second label acquired by performing at least one labeling process on at least one bounding box for training of the privacy-related region for training within the training image and at least one first label acquired by performing at least one labeling process on at least one class for training related to the bounding box for training.

12. The de-identifying device of claim 10, wherein each of the second ground truths corresponding to each of the region sizes for training and each of the first ground truths corresponding to each of the region probabilities for training respectively include at least one second label acquired by performing at least one labeling process on at least one segmentation for training of the privacy-related region for training within the training image and at least one first label acquired by performing at least one labeling process on at least one class for training for each of the pixels of the training image.

13. The de-identifying device of claim 9, wherein each of the region standard deviations is generated by a following equation:

$$\sigma = \text{Probability}^{\wedge}(A)*\exp(\text{Size}*B)*C$$

wherein said σ is a region standard deviation, said Probability is a region probability, said A is a first preset constant corresponding to the Probability, said exp is an exponential function, said Size is a region size, said B is a second preset constant corresponding to the Size, and said C is a third preset constant.

14. The de-identifying device of claim 13, wherein said A and said B are set as values between 0 and 1, inclusive, and wherein said C is set as a value above or equal to 0.

15. The de-identifying device of claim 9, wherein, at the process of (II), the processor (i) determines one or more specific pixels, among the pixels of the input image, in which each of the region probabilities thereof is equal to or greater than a threshold, (ii) calculates each of specific standard deviations for each of the specific pixels by using at least part of each of specific region probabilities corresponding to the specific pixels and each of specific region sizes corresponding to the specific pixels, thereby generating each of specific region standard deviations, and (iii) applies the de-identifying operation to each of the specific pixels of the input image by using each of the specific region standard deviations, to thereby de-identify the privacy-related region within the input image.

16. The de-identifying device of claim 9, wherein, at the process of (II), the processor (i) determines one or more specific pixels included in a specific privacy-related region among said at least one privacy-related region, (ii) averages specific standard deviations for the specific pixels included in the specific privacy-related region, to thereby acquire a specific average standard deviation, and (iii) applies the de-identifying operation to the specific privacy-related region by using the specific average standard deviation, to thereby de-identify the specific privacy-related region within the input image.

* * * * *